United States Patent
Mueen et al.

(10) Patent No.: US 10,853,372 B1
(45) Date of Patent: Dec. 1, 2020

(54) DISTRIBUTED PATTERN MATCHING OVER STREAMING TIME SERIES

(71) Applicant: STC.UNM, Albuquerque, NM (US)

(72) Inventors: Abdullah Mueen, Albuquerque, NM (US); Hossein Hamooni, Santa Clara, CA (US)

(*) Notice: Subject to any disclaimer, the term of this patent is extended or adjusted under 35 U.S.C. 154(b) by 302 days.

(21) Appl. No.: 15/829,575

(22) Filed: Dec. 1, 2017

Related U.S. Application Data

(60) Provisional application No. 62/429,633, filed on Dec. 2, 2016.

(51) Int. Cl.
  *G06F 11/30* (2006.01)
  *G06F 16/2455* (2019.01)
  *G06F 16/27* (2019.01)
  *G06F 40/103* (2020.01)

(52) U.S. Cl.
  CPC ...... *G06F 16/24568* (2019.01); *G06F 16/278* (2019.01); *G06F 40/103* (2020.01)

(58) Field of Classification Search
  CPC .............................................. G06F 16/24568
  See application file for complete search history.

(56) References Cited

U.S. PATENT DOCUMENTS 9,842,000 B2 * 12/2017 Bishop .............. G06F 16/24568
2017/0339203 A1 * 11/2017 Kekre .................... H04L 65/60

OTHER PUBLICATIONS

Gionis et al., "Similarity Search in High Dimensions via Hashing," Article, Proceedings of the 25th VLDB Conference, 1999.
Mueen et al., "MASS: Mueen's Algorithm for Similarity Search," Webpage, http://www.cs.unm.edu/~mueen/FastestSimilaritySearch.html, 2015.
Mueen et al., "Fast Approximate Correlation for Massive Time-series Data," Article, SIGMOD'10, 2010.
Mueen et al., "Online Discovery and Maintenance of Time Series Motifs," Article, KDD'10, 2010.
Shoeb et al., "Application of Machine Learning to Epileptic Seizure Detection," Article, Proceedings of the 27th International Conference on Machine Learning, 2010.
Apache Kafka, "Publish and Subscribe," Webpage, http://kafka.apache.org, 2015.
Faloutsos et al., "Fast Subsequence Matching in Time-Series Databases," Article, SIGMOD 94, 1994.
Yeh et al., "Matrix Profile I: All Pairs Similarity Joins for Time Series: A Unifying View that Includes Motifs, Discords and Shapelets," Article, 2016 IEEE 16th International Conference on Data Mining, 2016.

(Continued)

*Primary Examiner* — Phuong Huynh
(74) *Attorney, Agent, or Firm* — Valauskas Corder LLC

(57) ABSTRACT

This disclosure describes technologies for pattern matching in data streams. Given one or more patterns of data, and one or more data streams, e.g., streams of measurements made by one or more sensors, this disclosure provides apparatus and techniques for identifying occurrences of the patterns in the data streams. Techniques according to this disclosure generally make use of distribution strategies, as disclosed herein, to distribute the work of pattern identification among multiple processors. Data streams may be divided into multiple segments, and patterns for identification as well as data stream segments may be distributed among the multiple processors.

20 Claims, 5 Drawing Sheets

(56) References Cited

OTHER PUBLICATIONS

Yoon et al., "Earthquake detection through computationally efficient similarity search," Article, Sci. Adv. 1, 2015.
Physionet, "CHB-MIT Scalp EEG Database," Webpage, https://physionet.org/pn6/chbmit/, 2009.
Hamooni et al., "On URL Changes and Handovers in Social Media," Article, University of New Mexico, 2015.
Sart et al., "Accelerating Dynamic Time Warping Subsequence Search with GPUs and FPGAs," Article, 2010 IEEE International Conference on Data Mining, 2010.
Keogh et al., "Exact indexing of dynamic time warping," Article, Knowledge and Information Systems, 2004.
Keogh et al., "LB_Keogh Supports Exact Indexing of Shapes under Rotation Invariance with Arbitrary Representations and Distance Measures," Article, VLDB, 2006.
Petitjean et al., "A global averaging method for dynamic time warping, with applications to clustering," Article, Pattern Recognition44, 2011.
Jagadish et al., "iDistance: An Adaptive B+-tree Based Indexing Method for Nearest Neighbor Search," Article, ACM Transactions on Database Systems, 2005.
Assent et al., "Anticipatory DTW for Efficient Similarity Search in Time Series Databases," Article, VLDB '09, 2009.
Shier et al., "Polishing the Right Apple: Anytime Classification Also Benefits Data Streams with Constant Arrival Times," Article, 2010 IEEE International Conference on Data Mining, 2010.
Shieh et al., "iSAX: disk-aware mining and indexing of massive time series datasets," Article, Data Min Knowl Disc, 2009.
Lehman et al., "A Physiological Time Series Dynamics-Based Approach to Patient Monitoring and Outcome Prediction," Article, IEEE Journal of Biomedical and Health Informatics, 2013.
Wei et al., "Atomic Wedgie: Efficient Query Filtering for Streaming Time Series," Article, Proceedings of the Fifth IEEE International Conference on Data Mining, 2005.
Shokoohi-Yekta et al., "Discovery of Meaningful Rules in Time Series," Article, KDD'15, 2015.
Vlachos et al., "Indexing Multi-Dimensional Time-Series with Support for Multiple Distance Measures," Article, SIGKDD '03, 2003.
Makonin et al., "AMPds: A Public Dataset for Load Disaggregation and Eco-Feedback Research," Article, 2013 IEEE Electrical Power & Energy Conference, 2013.
Sarangi et al., "Dust: A Generalized Notion of Similarity between Uncertain Time Series," Article, KDD'10, 2010.
Apache, "Spark Streaming," Webpage, http://spark.apache.org/streaming, 2015.
Condie et al., "MapReduce Online," Article, NDSI, 2010.
Rakthanmanon et al., "Searching and Mining Trillions of Time Series Subsequences under Dynamic Time Warping," Article, KDD'12, 2012.
Sakurai et al., "BRAID: Stream Mining through Group Lag Correlations," Article, SIGMOD, 2005.
Zhu et al., "Matrix Profile II: Exploiting a Novel Algorithm and GPUs to Break the One Hundred Million Barrier for Time Series Motifs and Joins," Article, 2016 IEEE 16th International Conference on Data Mining, 2016.
Zhu et al., "StatStream: Statistical Monitoring of Thousands of Data Streams in Real Time," Article, VLDB, 2002.

* cited by examiner

US 10,853,372 B1

DISTRIBUTED PATTERN MATCHING OVER STREAMING TIME SERIES

CROSS REFERENCE TO RELATED APPLICATION

Priority is claimed to U.S. Provisional Application No. 62/429,633, filed on Dec. 2, 2016, entitled "DISPATCH: DISTRIBUTED PATTERN MATCHING OVER STREAMING TIME SERIES," which is incorporated by reference in its entirety.

STATEMENT OF GOVERNMENT SUPPORT

This invention was made with government support under contract number 1527127 awarded by the National Science Foundation. The government has certain rights in the invention.

BACKGROUND

Matching a dictionary of patterns (i.e. subsequences) over a streaming time series to identify occurrences is a primary component of real-time monitoring systems such as earthquake monitoring, industrial process monitoring and patient monitoring. Until now, the problem has been solved independently by smart pruning, efficient approximation and pattern indexing among many others. With advanced sensing and storing capabilities, the complexity of the dictionary matching problem is fast growing to larger dictionary size, faster data streams and critical constraints, pushing existing pattern matching systems to their limits. There is a need in the industry for more robust pattern matching technologies.

SUMMARY

This disclosure provides a robust distributed pattern matching system, referred to herein as a DisPatch system, and corresponding methods and computer readable media. The disclosed DisPatch system matches pattern(s) with guaranteed maximum delay after the pattern(s) appear in a data stream. The disclosed DisPatch system may make use of novel distribution strategies, disclosed herein, and may furthermore employ algorithmic optimization techniques disclosed herein. The disclosed DisPatch system is horizontally scalable to high data rates and large dictionary sizes, and produces exact results.

In some examples, distributed pattern matching methods disclosed herein may identify occurrences of one or more patterns in a data stream. Methods may include dividing the data stream into a plurality of overlapping windows; dividing each window into a plurality of overlapping partitions; determining a number of processors to identify occurrences of the one or more patterns in the data stream within a bounded delay time; distributing, to each respective processor among the determined number of processors, respective patterns from the one or more patterns to compare with respective partitions from the one or more partitions; and comparing, by each respective processor, the respective patterns with the respective partitions, in order to identify occurrences of the one or more patterns in the data stream.

In some examples, distributed pattern matching systems to identify occurrences of one or more patterns in a data stream may include a plurality of processors and a distributed pattern matching control system. The distributed pattern matching control system may generally perform the operations associated with the disclosed distributed pattern matching methods. Further aspects and embodiments are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
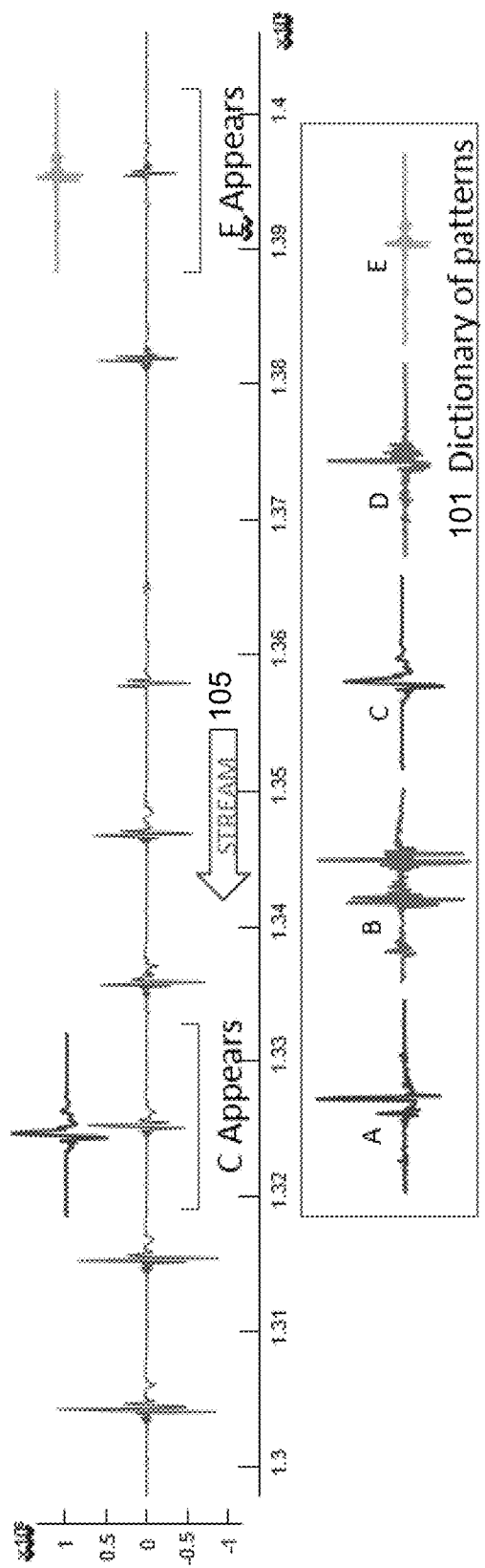
FIG. 1 illustrates an example dictionary of five patterns and a stream moving from right to left. A streaming pattern matching system identifies any occurrence of any of the patterns in the stream.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

In general, this disclosure is directed to computing technologies for pattern matching in data streams. Given one or more patterns of data, and one or more data streams, e.g., streams of measurements made by one or more sensors, this disclosure provides apparatus and techniques for identifying occurrences of the patterns in the data streams. Techniques according to this disclosure generally make use of distribution strategies, as disclosed herein, to distribute the work of pattern identification among multiple processors. Data streams may be divided into multiple segments, and patterns for identification as well as data stream segments may be distributed among the multiple processors.

FIG. 1 illustrates an example dictionary 101 of five patterns and an example data stream 105 moving from right to left. A streaming pattern matching system, such as disclosed herein, may identify any occurrence of any of the patterns 101 in the stream 105. In this example, Patterns C and E appear in the stream 105 with significant correlation.

Given a set of time series patterns 101, we consider the problem of matching the patterns 101 to the most recently observed samples (i.e. sliding window) of a streaming time series (data stream) 105 in order to identify occurrences of the patterns 101 in the data stream 105. In some embodiments, technologies described herein may be used for example to match previously observed and annotated patterns over a streaming time series in order to rapidly identify critical events in the streaming time series, and provide valuable lead time to manage disasters in diverse applications such as patient monitoring, seismic activity monitoring and process monitoring.

Recent development in data collection, distribution and mining, and wide adoption of real-time systems have exposed the shortcomings of existing pattern matching techniques. Modern sensing and transmission systems enable streaming data collection at an unprecedented rate; data mining techniques extract thousands of meaningful patterns; and time critical applications demand rapid response. Existing techniques fail at each of these advancements separately.

Existing methods on streaming pattern matching generally include single processor (CPU) systems that start falling behind the data stream, incrementally delay producing outputs, and eventually overflow allotted memory. For example, a typical electroencephalogram (EEG) headset produces 256 Hz signals at 60 electrodes creating a stream of 15,000 observations per second. If we have a small dictionary of, e.g., one eight-second (=2048 samples) long pattern, single CPU systems may fail. Even if the systems worked, their unrealistic assumptions such as nonnormalization and equal length patterns, would limit their applicability to monitoring applications.

We disclose a distributed pattern matching system, referred to herein as DisPatch, and corresponding methods for streaming time series data that can be exact, scalable and can guarantee outputs within a bounded delay. In the example EEG scenario above, DisPatch can match a pattern with two processors (also referred to herein as workers) and can guarantee detection within a second. DisPatch can scale almost linearly to match more patterns with more workers within a second. DisPatch performs overlapping windowing operations and distributes the windows and the patterns to multiple available workers. The computation in each worker may be optimized with state-of-the-art techniques for pruning, abandoning and reusing computation. In some embodiments, DisPatch may be flexible to work with various distance measures including Euclidean distance, Pearson's correlation coefficient, Manhattan distance and Dynamic Time Warping (DTW) distance. DisPatch need not assume any structure on the pattern dictionary, which can have variable length patterns in any order.

Features of the DisPatch system and method generally include:
 DisPatch provides a distributed system to match a dictionary of patterns to a stream of time series (data stream).
 DisPatch may be configured to guarantee both exactness and bounded detection delay.
 Given enough resources, DisPatch may comprehensively cover several independent dimensions: data rate, number of patterns, length of patterns, and maximum delay.
 DisPatch uses a novel distribution strategy to maximally utilize available compute resources and may adopt state-of-the-art optimization techniques for pruning, abandoning and reusing computations.
 DisPatch may be applied, inter alia, in novel applications of dictionary matching for critical monitoring tasks.

This disclosure is organized as follows: a problem definition section is followed by sections disclosing an example data stream and map reduce component, a general DisPatch framework, a map-reduce implementation, optimization techniques, and various example applications. Following these sections, a technical summary is provided with reference to FIG. 8 and FIG. 9. As discussed in the technical summary, this disclosure generally describes technologies which may be implemented via one or more computers, in particular, by computing systems including a Dispatch controller and multiple processors. A Dispatch controller may generally be configured with software to implement the teachings herein.

Problem Definition

We define a streaming time series, T, as a sequence of $(t_i, v_i)$ pairs representing the timestamp $(t_i)$ and value $(v_i)$ of the ith observation. The timestamps are integers in any valid time unit (e.g. milliseconds, minutes, etc.) The values are real numbers. We define the maximum sampling frequency (i.e. data rate) of a stream as R. DisPatch embodiments may assume a constant data rate at R. With the benefit of this disclosure, those of skill in the art may also build DisPatch systems which accommodate non-uniform data rates up to R. In most application domains, the data rate is set by economic, environmental and operational constraints, therefore, we assume no bound on the data rate.

A subsequence of a streaming time series is a contiguous sequence of observations (i.e. (t,v) pairs) over a period of time. The length of a subsequence is the number of observations in a subsequence (assuming constant data rate). A pattern is a subsequence of a specific length. A pattern dictionary is a set of patterns $P=\{p_1, p_2, \ldots, p_N\}$ of arbitrary lengths represented by $|p_i|$. Here, N is the number of patterns in the dictionary, and L is the length of the longest pattern in the dictionary (in seconds).

We define a matching function $M(d(x,y),\tau_d)$, where $d(x,y)$ is a distance function and $\tau$ is a threshold representing the maximum allowable distance to match two time series x and y of any length. M=true only if $d(x,y)<\tau$. An analogous definition of the matching function, $M(s(x,y),\tau_s)$ can be produced with a similarity measure $s(x,y)$ and a minimum similarity threshold $(\tau_s)$. DisPatch embodiments may support multiple distance and similarity measures such as correlation coefficient, Euclidean distance, Manhattan distance and Dynamic Time Warping (DTW) distance.

Problem 1. Given a streaming time series $T=(t_i,v_i)$, a set of patterns $P=\{p_1, p_2, \ldots, p_n\}$, a matching function $M(d(x,y),\tau_d)$, and a maximum time delay $max_D$, identify all subsequences in the stream matching to a pattern in the dictionary no later than $max_D$ seconds after the occurrences of the subsequences.

The above problem seeks an exact report of all matching subsequences. The need for exactness has been relaxed to gain processing speed in the past. However, some target domains are critical enough to care for all matches, as opposed to, e.g., 90% of the matches. In addition, we can always gain speed using more resources in a distributed setting; sacrificing exactness is no longer necessary for tractability.

The generic problem assumes one streaming time series. Ideally, for multiple independent streams, the DisPatch system can simply be replicated.

Example Data Stream and Map Reduce Component

While this disclosure is not limited to any specific data streams or implementing technologies, those of skill in the art may benefit from specific examples. Two example technologies discussed herein include Apache Kafka and Spark Streaming.

Apache Kafka is a high-throughput distributed messaging system, which may be used as one example standard data streaming protocol, upon which the disclosed DisPatch system may operate. Kafka is a publish-subscribe system which maintains set of topics to which users subscribes to. Data producers publish the messages to a topic, and a copy of the message is sent to all data consumers who have subscribed to that topic.

In some embodiments applied to Kafka data streams, a topic may be created per data stream, and the distributed pattern matching system may act as the consumer of all topics. This makes it possible for different data sources to publish their messages (data objects) to the Kafka server as producers, and DisPatch methods may subscribe to all topics to receive and process data from different sources in the same system. DisPatch systems may linearly scale to multiple sources by just adding more hardware resources for processing (See FIG. 2).

Kafka server combines multiple streams in one common stream in an arbitrary order. Consider a stream of data objects (s,t,v) where s is the stream ID, t is the time, and v is the value observed at that time. Assume we have two streams of data, one for temperature and one for humidity of a station. The object (1,20,78) denotes the 78° F. temperature in the first station at time 20, and (2,22,0.8) denotes the 80% relative humidity in the second station at time 22. We may receive (2,22,0.8) before (1,20,78). We adopt this flexibility and do not assume any specific order of data arrival.

Spark Streaming is a system that supports running map-reduce jobs on data streams. Spark Streaming is an extension of the core Spark API that enables scalable, high-throughput, fault-tolerant stream processing of live data streams. Spark Streaming collects stream data into small batches and processes each batch in distributed manner. Batches can be as small as 1 second long to as big as multiple hours long. While some example DisPatch embodiments may use Spark Streaming for implementing the disclosed methods, any framework which splits the data in to batches, and can run map-reduce jobs on the batches can be used to implement the disclosed methods.

General Dispatch Framework

Dictionary matching problems have previously been solved on single-CPU systems without any performance guarantee. In contrast, the disclosed DisPatch system may address at least two goals which were inadequately addressed by prior systems.

Scalability: The system may scale to a large number of combinations (and potentially all combinations) of input parameters.

Performance: The system may always (as opposed to on-average) produce outputs within a given delay requirement.

Figure 2:
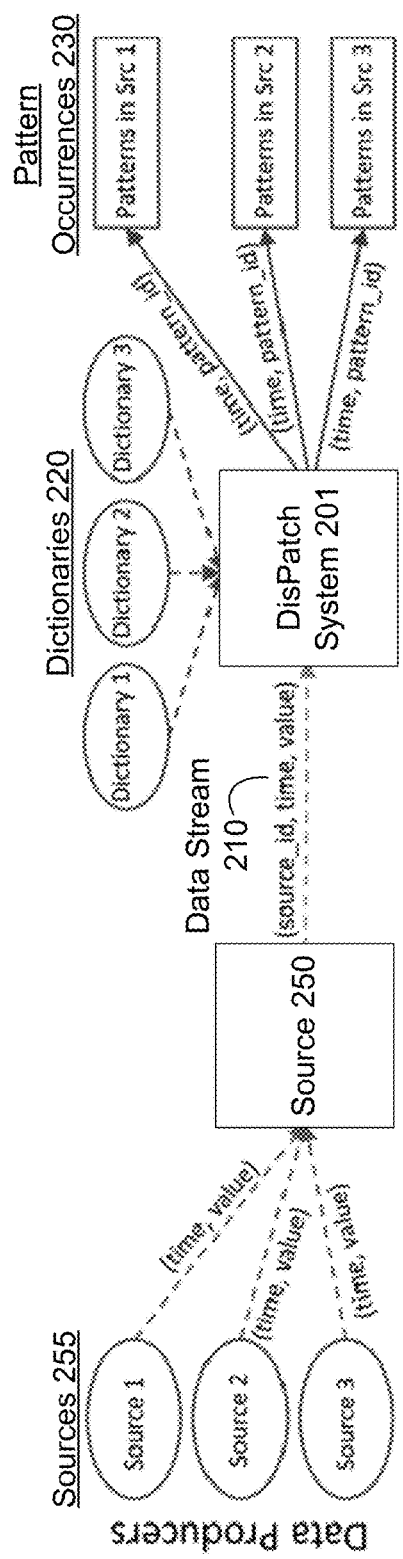
FIG. 2 illustrates an example framework in which a multiplexed stream of data is input to a DisPatch system at an arbitrary rate, and the DisPatch system finds (matches) patterns from dictionaries in the stream of data.

FIG. 2 illustrates an example framework in which a multiplexed stream of data 210 is input to a DisPatch system 201 at an arbitrary rate, and the DisPatch system 201 finds (matches) patterns from dictionaries 220 in the stream of data 210. The DisPatch system 201 may utilize dictionary patterns (Dictionary 1, Dictionary 2, Dictionary 3) of arbitrary lengths, and the DisPatch system 201 may output pattern occurrences 230, of the various patterns in dictionaries 220 found in data stream 210. In embodiments involving multiple data streams 210, the DisPatch system 201 may optionally apply different sets of dictionaries 220 to each input data stream 210. In the illustrated embodiments, the source 250 of data stream 210 may comprise, for example, a Kafka Publish/Subscribe system which aggregates data from multiple sources 255. This is one example source 250, and DisPatch system 201 may be adapted for pattern matching in data streams 210 from other sources, as will be appreciated.

The DisPatch system 201 may generally comprise three components, as follows:

Windowing: DisPatch batches the streaming data using overlapping windows. Windowing is a non-trivial task because of several free parameters including slide amount, overlap amount, and window size.

Distribution: DisPatch distributes the workload across a set of workers. We use map-reduce style distribution and implement an optimal distribution strategy.

Computation: DisPatch uses single-CPU pattern matching algorithms with state-of-the-art optimizations to prune off, abandon and/or reuse overlapping computation.

Each of the above components is discussed in further detail below.

Windowing

Figure 3:
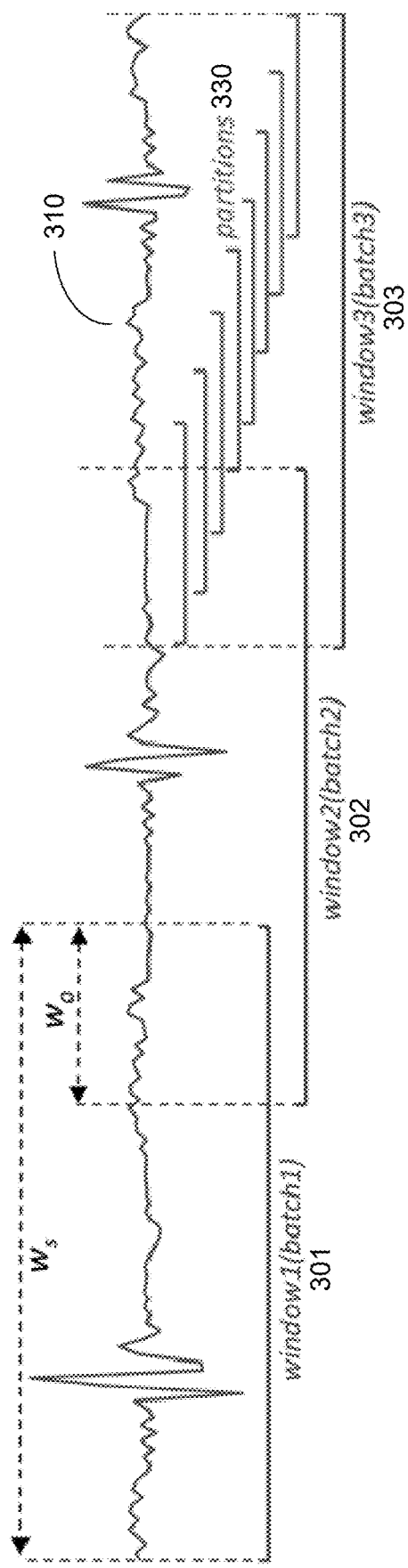
FIG. 3 illustrates example creation of batches out of a streaming time series and creation of partitions for each batch. Two parameters $w_s$ (window size) and $w_o$ (window overlap size) are also shown.

FIG. 3 illustrates example creation of windows 301, 302, 303 (also referred to herein as batches) out of a streaming time series 310 and creation of partitions 330 for each batch. Two parameters $w_s$ (window size) and $w_o$ (window overlap size) are also shown.

In the example embodiment illustrated in FIG. 2, the input to the DisPatch system 201 is a data stream 210 of time value pairs: $(t_1,v_1), (t_2,v_2), (t_3,v_3) \ldots$. In order to break down the stream 210 (or 310) in small batches 301, 302, 303, DisPatch system 201 may set two parameters: the length of the window in seconds ($w_s$) and the length of the overlap between two consecutive windows in seconds ($w_o$). In some embodiments, these two parameters may be specified such that DisPatch system 201 can guarantee bounded delay and exactness with optimum overhead. The two parameters are defined as below.

$$w_s = w_o + \max_D$$

$$w_o = \max(1,L)$$

$w_s$, $w_o$, and $\max_D$ may be positive integers with a unit of second. dLe selects the nearest larger second of L. In many application domains, a delay of one second is more than sufficient, while smaller units of time can be easily attained for ultra-fast data rate (e.g. MHz) using more resources. State-of-the-art stream processing frameworks (e.g. Spark Streaming) use the same windowing unit. Considering the way we define the windowing parameters, the following relationship may be derived.

$$w_s \geq \max(2,L)$$

In other words, $w_s \geq 2$ and $w_o \geq 1$. DisPatch system 201 may distribute and compute each window 301, 302, 303 independently and slide the window $w_s - w_o = \max_D$ second forward to create the next batch, and finish computation for current batch. The DisPatch system 201 may guarantee bounded delay assuming that we successfully scale the computation to finish within $\max_D$ seconds. If DisPatch 201 cannot finish the computation in $w_s - w_o$, it may alert the user (e.g., by displaying notification on a display coupled with a computing device) to provide more processors/worker nodes and/or relax the problem conditions. It may halt otherwise.

The above windowing approach can guarantee the exactness of the DisPatch framework. The overlapping segments ensure that DisPatch system 201 never misses a pattern on the border of two successive windows, because $w_o$ is longer than the longest pattern. Note that, for shorter $w_o$, the system 201 may miss some of the occurrences of patterns having larger lengths (i.e. $L \leq |p_i| > w_o$).

Length parameters (L, $w_o$, and $w_s$) may be defined in second units. We refer to these parameters in the rest of this disclosure either in seconds or in points interchangeably, which will be clear from the context. To convert a parameter from second units to point units, we multiply it by R. The reverse may be done by dividing the length by R.

Distribution

After windowing the input stream 310, the data points that gather on a same window, e.g., window 301, create a batch. At this stage, we have a time series of size $w_s$, and a set of patterns P to match with. DisPatch system 201 may slide each pattern in the set along the time series 310 and check if it matches with any subsequence by using a matching function M.

To exploit distributed computing platforms, DisPatch system 201 may distribute the matching process across multiple workers. Since each pattern in a dictionary may be matched independently of the others, it is reasonable to assign each worker a subset of the patterns (or exactly one pattern) to match. The time series in a batch can be distributed as well. In the naive extreme, we can distribute each distance or similarity calculation between a pattern and a subsequence of identical length to an independent worker. On the smart extreme, we can distribute the batch to minimal number of workers to exploit the overlap between successive distance calculations. To ensure bounded delay, the system 201 may be required to finish computation in $max_D$ seconds, and a sweet spot may lie somewhere in-between. DisPatch system 201 may create overlapping partitions 330 of a batched time series and have each worker compare a partition with a subset of the patterns (See FIG. 3). The size and the number of partitions 330 may be dynamically selected based on the problem complexity and the number of workers. DisPatch system 201 may slide the partition window one point at a time for the default distribution strategy, as described further herein. In the optimized distribution strategy, also described further herein, DisPatch system 201 may either slide the partition window multiple points or create one partition per batch (no sliding).

Computation

In some embodiments, DisPatch system 201 may distribute to each worker a partition of the time series and a subset of patterns. The worker may then find all the subsequences of the times series that are matched with any of the patterns, and report them. In case the size of the partition and the size of the pattern are equal, the worker just has one subsequence to check. The naive approach is to sequentially match each pattern along the time series. The naive approach has a total computational cost of $O(w_sL)$ for linear distance functions (e.g. Euclidean distance) and $O(w_sL^2)$ for quadratic distance functions (e.g. DTW). Based on the distance function D which is chosen by the user, we optimize the way the worker is searching the patterns to make it faster. Since this part is a bottleneck from the execution time perspective, making it faster will speed up the DisPatch system 201. Note that a new batch is ready to process every $w_s-w_o$ seconds. This means that all the calculations on a single batch may be done in $w_s-w_o$ seconds, or the system 201 may fall behind the stream 210 and cannot necessarily guarantee the maximum delay.

Map-Reduce Implementation

Once the windowing is done, DisPatch system 201 may use a distributed matching algorithm to find all the matched subsequences. We now provide an example map-reduce based algorithm for DisPatch frameworks. In some embodiments, a map-reduce based algorithm may implement the Distribution and Computation steps discussed above.

Map-Reduce Framework

Map Operation

Figure 4:
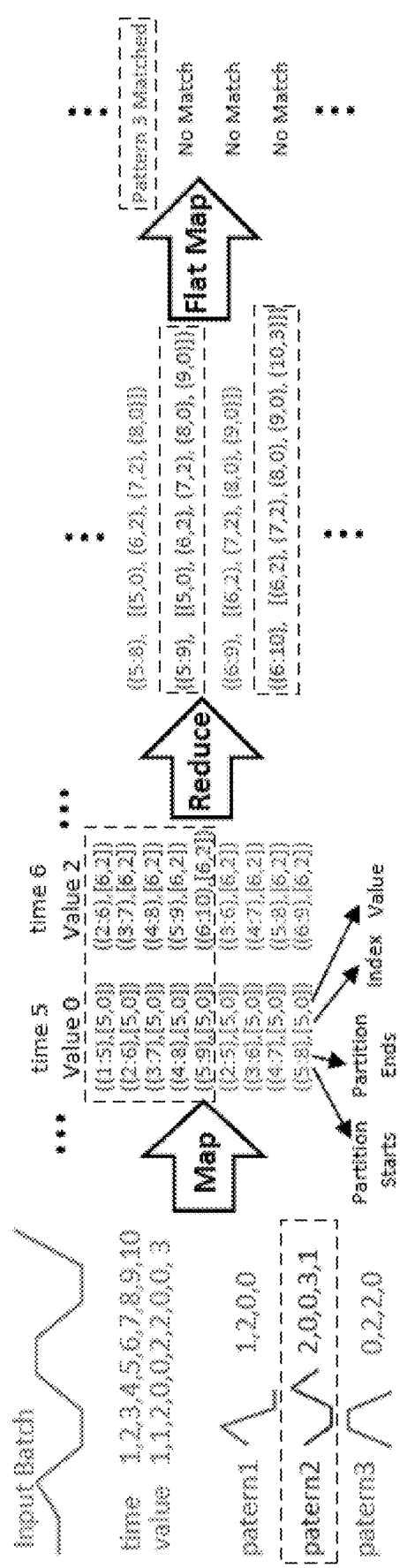
FIG. 4 illustrates example map-reduce operations. Dotted-line boxes show correspondence between patterns and partitions generated in the distribution step. In this example, a match is found with pattern 3 starting from time 5.

For each unique pattern length in a dictionary, DisPatch system 201 may create a sliding window of a same size as the pattern, slide the window along the time series, and send a set of key-value pairs to a reducer. This set of key-value pairs can later be consumed by the reducers to create partitions for a given batch of data points. For any data point like $(t_i,v_i)$ in the input stream, DisPatch system 201 may generate multiple key-value pairs, each of them playing the role of that data point in a different partition. FIG. 4 shows an example of how a map-reduce framework works. There are three patterns, two of them have 4 points, and one of them has 5 points. DisPatch system 201 may create all possible subsequences of length 4 and 5 in a data batch. Therefore, for a data point like (5,0) is a part of [1:5], [2:6], . . . , [5,9] subsequences of length 5 and a part of [2:5], [3:6], . . . , [5,8] subsequences of length 4, DisPatch system 201 may create 9 key-value pairs, as shown in FIG. 4. Note that although this example has two patterns of length 4 in the dictionary, DisPatch system 201 may create subsequences of length 4 once. This reduces the amount of memory needed by the workers.

FIG. 4 illustrates an example default Distribution and Computation strategy, in which DisPatch system 201 may slide a partition window one point at a time. In an optimized version of DisPatch system 201, the partition window may optionally slide multiple points, and exploit the overlap between successive distance calculations.

Algorithm 1 Map Function

Input: A data point (t,v)

Output: A set of key-value pairs

S=empty set Q=set of unique patterns' lengths for i=1, . . . , |Q| do l=Q[i] for j=t-l, . . . , t do tuple=((j: j+l),[(t,v)])

S.append(tuple)

return S

In Algorithm 1, DisPatch system 201 may generate a set of tuples ((J:j+l)[(t,v)]) for each data point (t,v). j is the first index of the partition, and j+l is the last index. (j:j+l) is used as the key for the reduce function. All data points with identical (j:j+l) value may be sent to a same reducer where they are sorted based on their indices, and later (not in this step) compared against the patterns of length l in the dictionary.

Reduce Operation

Once the key-value pairs are generated in the mapping step, the reducer may put together and sort the key-value pairs based on the time index. The output of the reduce stage is subsequences sorted and ready to be matched with the patterns in the dictionary. Algorithms 1 and 2 show how DisPatch system 201 may create and distribute the partitions through mappers and reducers. These two operations together may form the Distribution step.

Algorithm 2 Reduce Function
Input: Two sorted lists of key-value pairs A and B Output:
A constructed partition
    let A=((j:j+1), [($t_1^1,v_1^1$), . . . , ($t_n^1,v_n^1$)])
    let B=((j:j+1), [($t_1^2,v_1^2$), . . . , ($t_m^2,v_m^2$)])
    S=Do a merge sort on the set of time-value pairs in A
    and B
    return S DisPatch system 201 may use a merge sort operation to merge and sort the time-value pairs that are given to the reduce function as the input. Note that the running time of Algorithm 2 is O(n+m), since both input lists are already sorted.

Flat Map Operation

In an example Computation step, each worker's job is to compare a subset of the patterns in the dictionary (which have identical lengths) with a subsequence of a same size by using a matching function M. The pattern and the subsequence at this step may be of identical length because of the way DisPatch system 201 may create the partitions. The worker gets a subsequence of length l and compares that against all the patterns of length l in the dictionary by using the matching function.

Algorithm 3 Flat Map Function
Input: Subsequence X, Dictionary P Output: Matched patterns with X if any for i=1, . . . , |P| do
    if |X|==|P[i]| then
        if M(d(X,P[i]),$\tau_d$)==True then
            return i
    return null Analysis of the Map-Reduce Framework The map function of the DisPatch framework (Algorithm 1) produces ($w_s$Nl) tuples where N is the number of patterns in the dictionary and l is the average length of the patterns in the dictionary in points. This number can become large for real world applications. Since all the computations on a batch may be done in $w_s$–$w_o$ seconds, the baseline method may fall behind the stream if the mappers and reducers have to do many jobs. However, based on the matching function chosen by the user, we can optimize the Distribution and Computation steps in such a way that the DisPatch system 201 does much less computation. Example optimization techniques are discussed herein.

Supported Distance Measures

The DisPatch methods described herein may support different distance/similarity measures, used in the matching function. In some embodiments, the user may have the freedom to choose a distance measure based on his needs. He can also define his own distance function. Since every distance measure may involve its own optimization techniques, we discuss several example distance measures separately. We first explain how each distance measure can be calculated and its time complexity, and then we discuss techniques to optimize it. Given two time series P and Q of length n, we define four distance/similarity measures that may be supported in DisPatch system 201. See Table 1 for a list of example supported matching functions.

There is no specific range for any of the distance measures described herein, except correlation coefficient. Since the distance between a subsequence and a pattern can be higher for longer patterns, embodiments may allow users to give a separate matching threshold for each pattern in a dictionary. To provide more flexibility and consistency for the user, embodiments may normalize all the distance measures in the range [−1,1]. In this case, the user provides one threshold for the matching function, and DisPatch system 201 may use the provided threshold to find the matches regardless of the length of the patterns. We will discuss the normalization process for each distance measure separately.

TABLE 1

List of supported distance/similarity measures and the corresponding matching functions.

| Dist./Sim. Measure | Matching Function |
|---|---|
| Pearson's Correlation | Cor(x, y) ≥ threshold |
| Euclidean Distance | Euclidean(x, y) ≤ threshold |
| Manhattan Distance | Manhattan(x, y) ≤ threshold |
| DTW Distance | DTW(x, y) threshold |

In some embodiments, DisPatch system 201 may implement multiple distance/similarity measures, for example, some or all of the four most popular distance/similarity measures may be implemented. We explain two of the distance measures in this section (Manhattan and DTW) along with optional techniques to speed them up. We explain the other two distance/similarity measures (Euclidean distance and correlation coefficient) in another section, where we show how to exploit the overlap between successive distance calculations to increase the processing capacity of the DisPatch system 201.

Manhattan Distance

Manhattan distance can be calculated by using Equation 1, below. The time complexity to calculate this distance is O(n) where n is the length of the input time series. We define the matching function as Manhattan(x,y)≤threshold.

$$Manhattan(P, Q) = \sum_{i=1}^{n} |P_i - Q_i| \quad (1)$$

To optimize the pattern matching process under Manhattan distance, DisPatch system 201 may use an early abandoning technique in the Computation step. Since Manhattan distance is a sum of some non-negative numbers, the early abandoning technique is applicable. Embodiments may abandon the distance calculation whenever the distance threshold provided by the user is surpassed.

DTW Distance

DisPatch system 201 may allow matching patterns under an elastic distance measure such as Dynamic Time Warping (DTW). Dynamic time warping allows signals to warp against one another. Constrained DTW allows warping within a window of w samples and is defined as follows.
    DTW(x,y)=D(m,m)
    D(i−1,j)
    D(i,j)=$(x_i-y_j)^2$+min
    D(i,j−1)
    D(i−1,j−1)
    D(0,0)=0, $\forall_{i>0>0}$
    D(i,0)=D(0,j)=∞, $\forall_{|i-j|>w}$D(i,j)=∞

Embodiments may normalize the DTW distance by the length of the warping path. This scales the DTW distance in the range [−1,1].

$$Norm_{DTW}(P, Q) = \frac{DTW(P, Q)^2}{2 \times PL(P, Q)} - 1 \quad (2)$$

Here PL(P,Q) is the warping path length of the solution in the dynamic programming table of DTW. Given a time series X and a query Y, where |X|=n, |Y|=m, and n≥m, calculating the DTW distance between Y and all subsequences of X of length m takes $O(nm^2)$. This is an order of magnitude more computation compared to the nonelastic measures, utilizing more workers to guarantee a same $max_D$.

A variety of techniques exist to speedup DTW based similarity search, and any such techniques may be incorporated into embodiments of this disclosure. For example, the LB Keogh lower bounding technique, the early abandoning technique, the hardware acceleration technique, the summarization technique, the anticipatory pruning technique, and others may all be appropriate for some embodiments.

In an example application of the LB Keogh lower bounding technique, the process of finding matches may be accelerated. LB Keogh generates two envelopes (U and L) of a candidate and compares them with the query to produce the lower bound. LB Keogh takes linear time for computation and insignificant off-line preprocessing for the envelopes. The formula to compute U, L and LB Keogh where w is the constraint window is given below.

$$\forall\ iU_i = \max(x(i-w:i+w)) \forall\ iL_i = \min(x(i-w:i+w))$$

$$LB_{Keogh} = \sum_{i=1}^{n} \begin{cases} (y_i - U_i)^2 & \text{if } y_i > U_i \\ (y_i - L_i)^2 & \text{if } y_i < L_i \\ 0 & \text{otherwise} \end{cases}$$

To optimize the pattern matching under DTW distance, DisPatch system 201 may use LB Keogh in the Computation step. The worker receives an equi-length subset of the patterns and a subsequence. For each pattern, the worker calculates the LB Keogh in linear time. If the calculated LB Keogh is larger than the maximum DTW distance ($max_D$) specified in the matching function, DisPatch system 201 may not calculate the real DTW distance, since the real DTW distance is definitely larger than the maximum allowed. Otherwise, DisPatch system 201 may compute the expensive DTW matrix.

Euclidean Distance

Euclidean distance can be calculated by using Equation 3, below. The time complexity of calculating the Euclidean distance is O(n). In this case, we define the matching functions as Euclidean(x,y)<threshold. We describe the optimization techniques we use for Euclidean distance in a subsequent section.

$$Euclidean(P, Q) = \sqrt{\sum_{i=1}^{n} (P_i - Q_i)^2} \qquad (3)$$

Correlation Coefficient

Pearson's correlation, e.g., using Equation 4, below, is a measure of the linear dependence between two time series P and Q, giving a value between +1 and −1 inclusive, where 1 is total positive correlation, 0 is no correlation, and −1 is total negative correlation. We explain how to speed up matching under correlation coefficient in a subsequent section.

$$Cor(P, Q) = \frac{\sum_{i=1}^{n} (P_i - \overline{P})(Q_i - \overline{Q})}{\sqrt{\sum_{i=1}^{n} (P_i - \overline{P})^2} \sqrt{\sum_{i=1}^{n} (Q_i - \overline{Q})^2}} \qquad (4)$$

Optimization Techniques

DisPatch system 201 may employ a variety of optimization techniques. For example, the Distribution and Computation steps may be optimized by exploiting the overlap between successive distance calculations to increase the processing capacity of the system. We explain an example Distribution and Computation strategy for Euclidean distance and correlation coefficient distance measures. We also explain how the described strategy can be adapted for Manhattan distance and DTW distance measures.

Euclidean Distance

Given a time series X and a query Y, where |X|=n, |Y|=m, and n≥m, calculating the Euclidean distance between Y and all X's subsequences of length m takes O(nm). We explain how this process can be optimized for faster execution in this section.

Pattern matching under a non-elastic linear distance measure (e.g. correlation, Euclidean distance, Manhattan distance) includes calculating dot products between the pattern and all subsequences of a given time series. DisPatch system 201 may use an algorithm, e.g., a MASS (Mueen's Algorithm for Similarity Search) algorithm to find all distances between the query pattern and subsequences of the time series in O(n log n) operation. An example MASS algorithm is provided below.

Example MASS Algorithm
function dist=findNN(x,y)
    % x is the data, y is the query

```
n = length(x);
y = (y-mean(y))./std(y,1);        %Normalize the query.
m = length(y);
x(n+1:2*n) = 0;                   %Append zeros
y = y(end:-1:1);                  %Reverse the query
y(m+1:2*n) = 0;                   %Append zeros
```

% In order to get dot products in O(n log n) time.

```
X = fft(x);                       %Change to Frequency domain
Y = fft(Y);                       %Change to Frequency domain
Z = X.*Y;                         %Do the dot product
z = ifft(Z);                      %Come back to Time domain
%compute y stats -- O(n)
sumy = sum(y);
sumy2 = sum(y.^2);
%compute x stats -- O(n)
cum_sumx = cumsum(x);             %Cumulative sums of x
cum_sumx2 = cumsum(x.^2);         %Cumulative sums of x^2
sumx2 = cum_sumx2(m+1:n)-cum_sumx2(1:n-m);   %Sum of x^2 of subsequences
sumx = cum_sumx(m+1:n)-cum_sumx(1:n-m);      %Sum of x of subsequences
```

-continued

```
meanx = sumx./m;                          %Mean of subsequences
sigmax2 = (sumx2./m)-(meanx.^2);
    sigmax = sqrt(sigmax2);               %Standard deviation subsequences
    %computing the distances -- O(n) time.
    dist = (sumx2-2*sumx.*meanx + m*(meanx.x^2)./sigmax2 - 2*(z(m+1:n) -
sumy.*meanx)./sigmax + sumy2;
    dist = abs(sqrt(dist));
end
```

Figure 5:
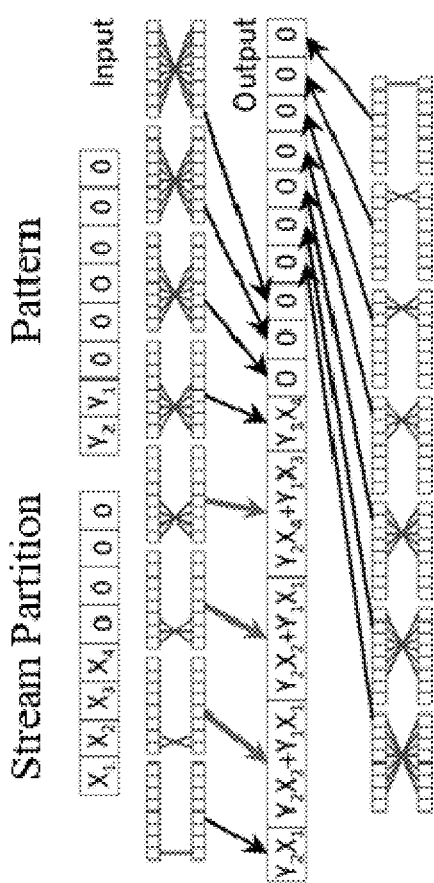
FIG. 5 illustrates an example convolution operation being used to calculate sliding dot products for time series data.

FIG. 5 illustrates an example convolution operation being used to calculate sliding dot products for time series data. In FIG. 5, note the reverse and append operation on X and Y in the input. Fifteen dot products are calculated for every slide. The cells m (=2) to n (=4) from left (green/bold arrows) contain valid products. Algorithm 4 (below) and FIG. 5 describe a convolution based process of calculating all sliding dot products. Sliding dot products are sufficient to calculate the Euclidean distances with or without z-normalization. Using an algorithm such as MASS, we can calculate the Euclidean distance between Y and all X's subsequences of length m in O(n log(n)).

Algorithm 4 SlidingDotProducts

Input: A time series X, a pattern Y, |X|>|Y| Output: All sliding dot products between Y and subsequences of X
        n←length(X), m←length(Y)
        $X_a$←Append X with n zeros
        $Y_r$←Reverse Y
        $Y_{ra}$←Append $Y_r$ with 2n−m zeros
        $Y_{raf}$←FFT($Y_{ra}$),   $X_{rf}$←FFT($X_r$)   XY←InverseFFT ($Y_{raf}$*$X_{rf}$) return XY The way we specify $w_s$ guarantees that $w_s \geq L$. This means that even the longest pattern in the dictionary fits in one batch. A purpose of the Distribution step is to distribute the matching tasks to the workers, to gain speed. The default distribution strategy may create all overlapping partitions for each pattern length in the dictionary so that the partition and the patterns have identical length. Considering the improved distance calculation method we discussed in this section (MASS), we create longer partitions (if possible), and the workers in the Computation step may check a subset of the pattern dictionary against all the subsequences in the partition. The partition size can be equal to $w_s$ in some cases, meaning that we create just one partition for a given batch. If N≥#workers, we create one partition per batch and distribute the patterns between the worker. This gives us the maximum speed. If N≤#workers, it means that we do not have enough patterns to keep all the workers busy. Therefore, it is better to create more than one overlapping partition in each batch to utilize all the workers. Ideally, we want to create (#workers/N) overlapping partitions. In order to not miss any pattern on the border of two partitions, embodiments may ensure that the length of the overlap is no less than L. The windowing techniques described herein may be used to overlap the partitions. An overlap size may be set to L. Therefore, the length of each partition would be $$L + \frac{(w_s - L) \cdot N}{\#workers}.$$

In this case, embodiments may send a subset (subsequence) of the batch and a pattern to a worker. This utilizes all the workers maximally and produces the results as fast as possible.

Note that optimized approaches may be much faster than the default Distribution and Computation strategies, and optimized approaches may also involve less memory since it produces less key-value pairs in the Map operation. The reason is that optimized approaches generates fewer partitions for a given data batch and dictionary compared to the default mode.

Correlation Coefficient

Pearson's correlation coefficient and normalized Euclidean distance are related as below.

$$corr(P, Q) = 1 - \frac{d^2(\hat{P}, \hat{Q})}{2m}$$

Here $\hat{P}$ is the z-normalized form of P and m is the length of the two time series. The time complexity to calculate the Pearson's correlation is O(n). We define the matching function as corr(x,y)≥threshold. We can use the same or similar optimization techniques as used for Euclidean distance.

Manhattan Distance

Manhattan distance (road mileage) is always larger than Euclidean distance (flight mileage). We use this fact to calculate lower bound distance using the convolution based technique described above. The subsequences for which the lower bounds are larger than the given threshold (τ) and do not involve further validation by exact distance computation.

The quality of this method depends on two factors: tightness of the lower bounds, which largely depends on data, and the allowable overhead, which corresponds to the compute platform the system is running on.

DTW Distance

For DTW distance measures, methods to exploit overlaps while matching a pattern against a long time series have been discussed in the literature. Example methods cost O(nm) time and space to match a pattern of length m with a long-time series of length n. However, available algorithms do not z-normalize the subsequences before calculating the distances, which limits the applicability of available methods in most of our application domains.

A naive exact method to match patterns with z-normalization under DTW distance involves $O(nm^2)$ time and O(n) space cost. Such methods may reduce computation time with pruning and early abandoning techniques while z-normalizing each subsequence independently. Therefore, prioritizing z-normalized matching, embodiments may resort to pruning and abandoning DTW calculations in the workers.

Applications

Matching a dictionary of patterns with a streaming time series enables novel monitoring use cases in critical application domains including, e.g., seismic monitoring, patient monitoring and power usage monitoring. We show two unique use cases in this section.

Patient Monitoring

Figure 6:
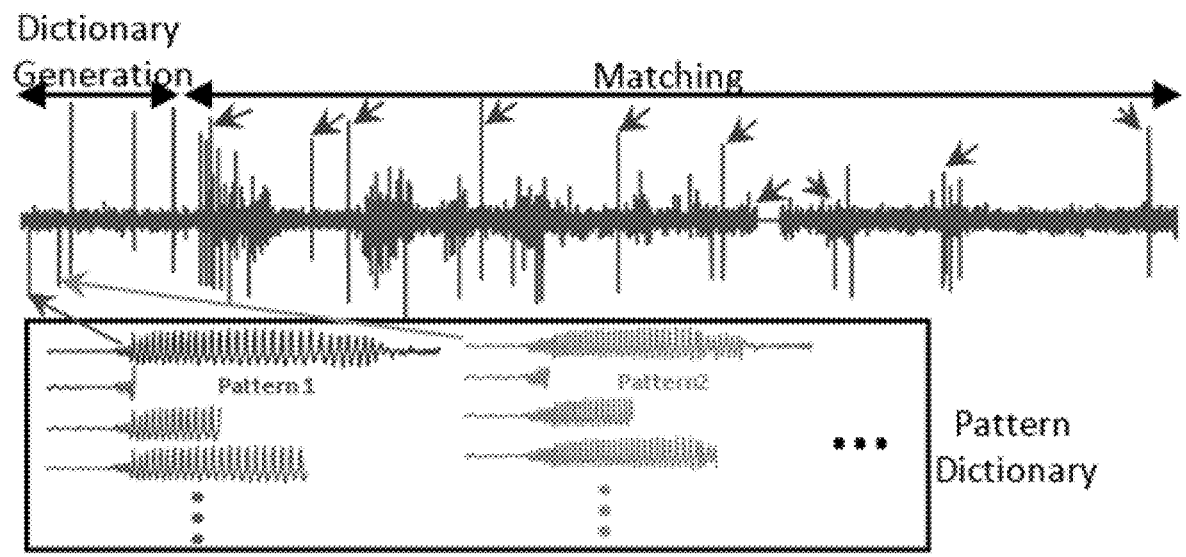
FIG. 6 illustrates an example application of pattern matching in the context of an EEG recording of an epileptic patient.

FIG. 6 illustrates an example application of pattern matching systems and methods, as disclosed herein, in the context of an electroencephalogram (EEG) recording of an epileptic patient. In FIG. 6, the illustrated data stream is an EEG recording of an epileptic patient for 21 hours at 256 Hz. In a dictionary generation stage, an enhanced dictionary is created in an unsupervised fashion using the first 3.5 hours of the data stream. In a matching stage, the generated dictionary of patterns is used by a DisPatch system 201 to predict 10 out of 11 seizures well ahead of time, in the remaining 18 hours of the data stream. Arrows show the index of the matched patterns.

Numerous measurement devices exist that are used in various combinations to monitor patients in hospitals. For example, EEG devices measure brain activity, Oximeters measure the level of Oxygen in blood and so on. Such devices can stream uniformly sampled measurements, which can be analyzed to produce patient-personalized dictionaries of patterns. These patient-personalized patterns may subsequently be matched by DisPatch systems described herein, to identify recurrence of events. To elaborate, consider the EEG recording of an epileptic patient in FIG. 6. The patient had several seizures during data collection. We replay the data at 256 Hz to demonstrate a personalized monitoring scenario.

In one example method, an online unsupervised motif discovery tool may be used to create a dictionary of five repeating patterns, e.g., by observing the first 200 minutes of the data (dictionary generation step). All of the five patterns correspond to seizures and show a clear signature shape. The dictionary may be enhanced by taking several prefixes so that we can detect the seizure as early as possible. Next we channel the EEG data stream through DisPatch with the enhanced dictionary and a minimum correlation coefficient of 0.6 as the matching function. The patient had eleven more seizures, and the disclosed DisPatch system could detect almost all of them (10 out of 11) with up to twenty seconds of lead time. Thus, DisPatch along with the motif mining can potentially enable highly specialized monitoring with no previously labeled data.

Power Consumption Monitoring

Figure 7:
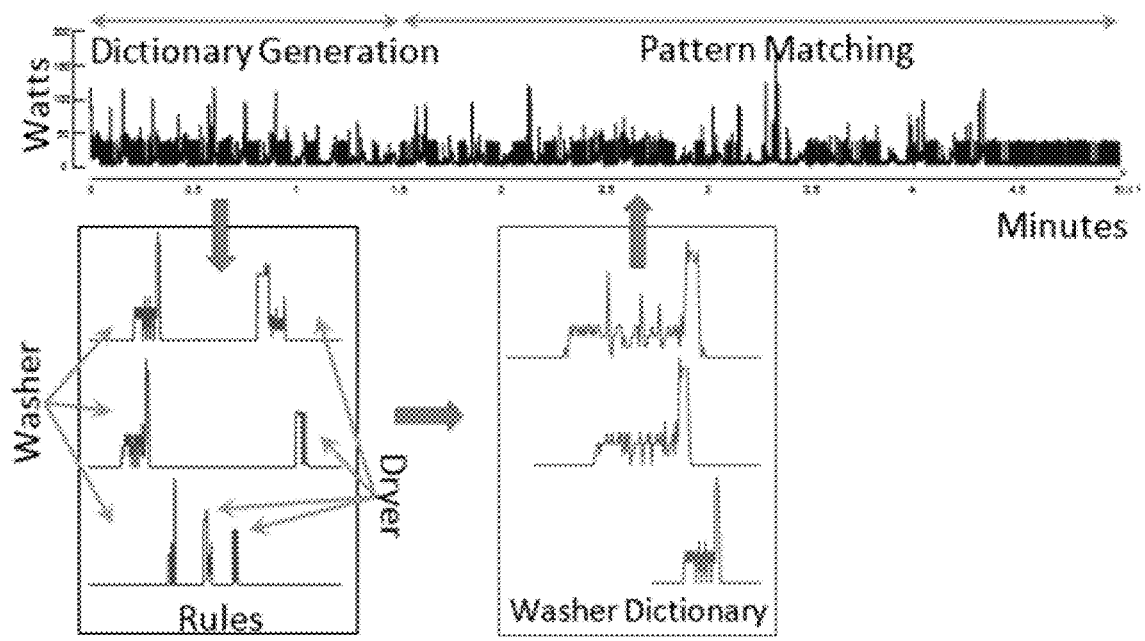
FIG. 7 illustrates an example application of pattern matching in the context of whole house power consumption data.

FIG. 7 illustrates an example application of pattern matching systems and methods, as disclosed herein, in the context of whole house power consumption data. Monitoring and predicting power consumption is an important objective for both power companies and consumers. We demonstrate that DisPatch is useful in power consumption monitoring.

Controllers of most home appliances and power tools may be characterized as very simple deterministic state machines which create signature patterns. In addition, home owners often develop usage pattern with identical daily/weekly frequency, duration and sequence of appliance/tool usages. For example, a common usage pattern is that the dryer starts very shortly after the washer stops.

Unsupervised rule discovery algorithms can optionally be used to find such patterns in consumption history and create a set of rules followed by a dictionary of antecedent patterns. The antecedents of the rules form a dictionary, in this case a washer dictionary. DisPatch may then be applied, e.g., to match the dictionary to subsequent data, to predict dryer usages. Note, in FIG. 7, the gap between the washer and dryer, and the number of times an appliance is used are variable. We replay a stream of whole house power consumption data from a smart home and successfully predict dryer usage based on washer usage with 65% precision.

TECHNICAL SUMMARY

Figure 8:
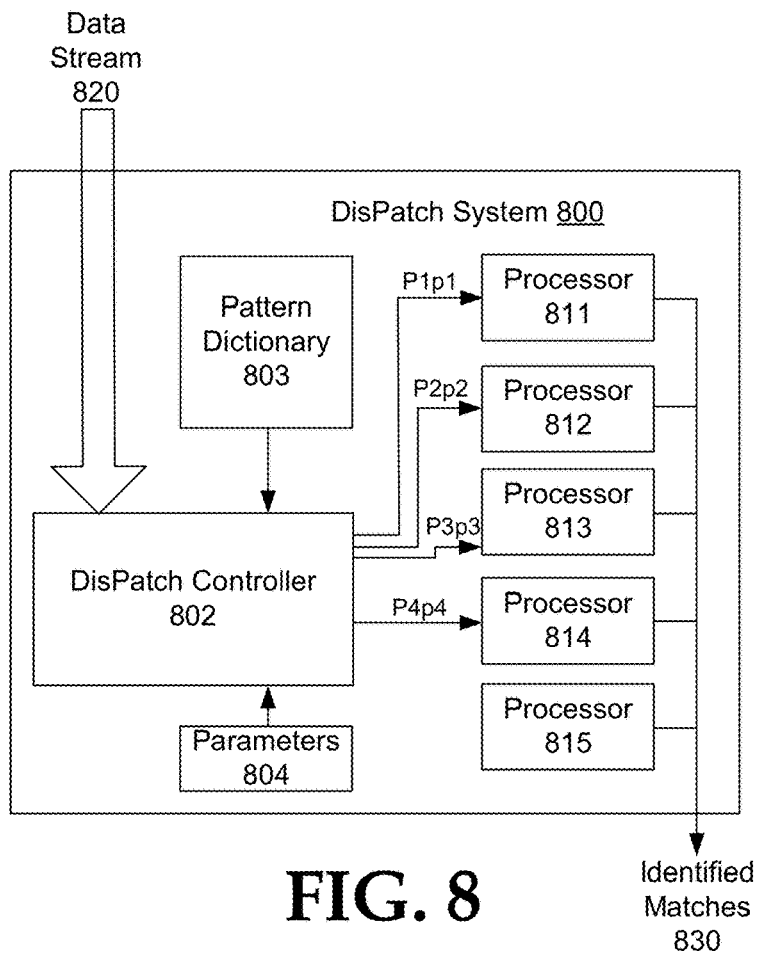
FIG. 8 illustrates an example distributed pattern matching system.

FIG. 8 illustrates an example distributed pattern matching (DisPatch) system, in accordance with at least some embodiments of this disclosure. DisPatch system 800 includes a DisPatch controller 802, a pattern dictionary 803, parameters 804, and a plurality of processors 811, 812, 813, 814, 815.

In general, a data stream 820 may be input to DisPatch system 800. The data stream 820 may comprise any data, for example, the Kafka system data described herein, or earthquake monitoring data, industrial process monitoring data, patient monitoring data, power consumption or output data, or any of a great number of other potential data streams. DisPatch system 800 may identify, in the data stream 820, instances of patterns included in pattern dictionary 803. DisPatch system 800 may output identified matches 830 which indicate, e.g., portions of data stream 820 comprising occurrences of the patterns in pattern dictionary 803.

DisPatch controller 802 may comprise a distributed pattern matching control system. DisPatch controller 802 may be configured to divide the data stream 820 into a plurality of overlapping windows, and divide each window into a plurality of overlapping partitions, as described herein.

For example, DisPatch controller 802 may determine an appropriate window size and window overlap, as described herein. In some embodiments, an overlap of the plurality of overlapping windows may be equal to or greater than a length of a longest pattern among the patterns in pattern dictionary 803. DisPatch controller 802 may furthermore determine an appropriate partition size and partition overlap. In some embodiments, a length of one or more partitions may be substantially equal to a length of at least one pattern in pattern dictionary 803, and an overlap of the plurality of overlapping partitions may be a full length of a partition minus one sample.

DisPatch controller 802 may determine, e.g., using the map reduce techniques disclosed herein, a strategy for distributing the work of pattern matching among the various processors 811-815. This determination may take into account a number of different factors, including, e.g., the number of patterns in pattern dictionary 803, the sizes of patterns in pattern dictionary 803, the data rate or number of different data streams included data stream 820, the bounded delay time as may be specified among parameters 804, and the distance measure as may be specified among parameters 804. Parameters 804 such as bounded delay time may be user-specified in some embodiments. DisPatch controller 802 may be adapted to provide a User Interface (UI) on a display, through which users may interact with DisPatch controller 802, e.g., by specifying bounded delay time and other parameters, or by initiating pattern matching for a particular data stream 820 or viewing identified matches 830.

As part of the determined distribution strategy determined by DisPatch controller 802, DisPatch controller 802 may determine a number of the plurality of processors 811-815 to use to do the work of identifying occurrences of patterns in the data stream 820 within a bounded delay time. For example, the DisPatch controller 802 may determine that four of the five available processors will be used, as shown in FIG. 8. Of course, in other embodiments, more or fewer processors may be available, and DisPatch controller 802 may determine a larger or smaller number of processors for use in pattern matching for a given data stream 820.

DisPatch controller 802 may distribute, to each respective processor among the determined number of processors, respective patterns from the one or more patterns to compare with respective partitions from the one or more partitions. For example, in FIG. 8, DisPatch controller 802 has determined to use four of the five available processors. DisPatch controller 802 may distribute a first partition (P1) and a first pattern (p1) to processor 811, a second partition (P2) and a second pattern (p2) to processor 812, a third partition (P3) and a third pattern (p3) to processor 813, and a fourth partition (P4) and a fourth pattern (p4) to processor 814. In this example, DisPatch controller 802 did not distribute any work to processor 815.

While in the example illustrated in FIG. 8, DisPatch controller 802 distributes one pattern and one partition to each processor, of course it will be appreciated that using the techniques described herein, any number of partitions, and any number of patterns, may be distributed to any of the various processors. In some distribution approaches, DisPatch controller 802 may distribute partitions associated with different windows to different processors. For example, distributing partitions may comprise assigning first partitions associated with a first window to a first processor, e.g., processor 811, and assigning second partitions associated with a second window to a second processor, e.g., processor 812.

In some distribution approaches, DisPatch controller 802 may distribute patterns among the various processors 811-812 based in part on pattern length. For example, distributing patterns may comprise assigning patterns of substantially a first length to a first processor, e.g., processor 811, and assigning patterns of substantially a second length to a second processor, e.g., processor 812.

After DisPatch controller 802 distributes patterns and partitions among the various processor, each respective processor may compare its respective patterns with its respective partitions, in order to identify occurrences of the one or more patterns in the data stream 820. Comparison operations may be performed by processors 811-815, e.g., according to any comparison techniques known in the art or as may be developed, with the comparison techniques disclosed herein providing several useful examples. Furthermore, comparing respective patterns with respective partitions may comprise applying a distance measure, such as any of the various distance measures described herein, to define similarity between the respective patterns and the respective partitions. Each respective processor may output its identified matches 830. Identified matches may comprise occurrences, in data stream 820, of one or more patterns from pattern dictionary 803. Matches may be returned to DisPatch controller 802 and/or output from DisPatch system 800, as appropriate for particular configurations.

Figure 9:
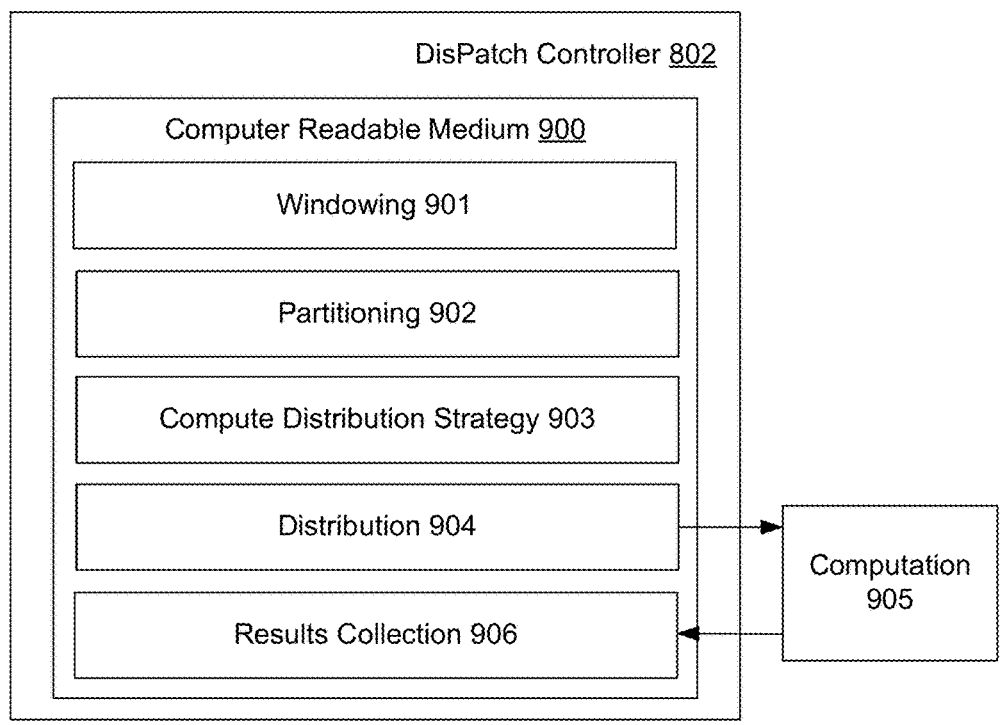
FIG. 9 illustrates an example distributed pattern matching method.

FIG. 9 illustrates an example DisPatch controller 802, in accordance with at least some embodiments of this disclosure. DisPatch controller 802 may comprise a computing device, including one or more processors and memory, optionally coupled with input/output devices such as keyboards and displays, as will be appreciated. A computer readable medium 900 may be stored in a device memory, and comprise a variety of functional modules. The various functional modules may be executed by the device processor and may cause the DisPatch controller 802 to carry out distributed pattern matching methods described herein. Therefore, modules 901, 902, 903, 904, 905 and 906 represent instructions as may be stored on computer readable medium 900, as well as steps in example methods. In some embodiments, modules 901, 902, 903, 904, 905 and 906 may be re-ordered, combined, or eliminated as will be appreciated.

At a "Windowing" block 901, DisPatch controller 802 may divide the data stream 802 into a plurality of overlapping windows. In some embodiments, an overlap of the plurality of overlapping windows may be equal to or greater than a length of a longest pattern among the one or more pattern in pattern dictionary 803. DisPatch controller 802 may dynamically determine window size, or window size may optionally be set by the user. Windowing block 901 may be followed by partitioning block 902.

At a "Partitioning" block 902, DisPatch controller 802 may divide each window into a plurality of overlapping partitions. In some embodiments, a length of one or more partitions may be substantially equal to a length of at least one pattern in pattern dictionary 803, and an overlap of the plurality of overlapping partitions may be a full length of a partition, minus one sample. Other partition lengths and overlaps are also possible, as described herein. Partitioning block 902 may be followed by compute distribution strategy block 903.

At a "Compute Distribution Strategy" block 903, DisPatch controller 802 may determine a number of processors among processors 811-815 to use for pattern matching, and DisPatch controller 802 may determine which partitions, and which patterns, are to be processed by each processor. The number of processors and distribution strategy may account for several different variables, including, e.g., bounded delay time. In general, more working processors can accomplish pattern matching faster, bringing down the processing time to identify patterns. The DisPatch controller 802 may determine a number of processors which is sufficiently large, such that the processing time can be guaranteed to be lower than a specified bounded delay time.

In some embodiments, at block 903, DisPatch controller 802 may assign partitions on a window-by-window basis, wherein first partitions associated with a first window are assigned to a first processor, and second partitions associated with a second window are assigned to a second processor, and so on. In some embodiments, at block 903, DisPatch controller 802 may assign patterns of different lengths to different processors, for example, DisPatch controller 802 may assign patterns of substantially a first length to a first processor, and DisPatch controller 802 may assign patterns of substantially a second length to a second processor, and so on. In some embodiments, at block 903, DisPatch controller 802 may apply the map reduce techniques disclosed herein to compute a distribution strategy, and the map reduce techniques may optionally be optimized as described herein. Compute distribution strategy block 903 may be followed by distribution block 904.

At a "Distribution" block 904, DisPatch controller 802 may distribute, to each respective processor among the number of processors determined at block 903, respective patterns from the one or more patterns in dictionary 803 to compare with respective partitions created at block 902. The distribution at block 904 may generally distribute patterns and partitions to different processors according to the distribution strategy computed at block 903. Distribution 904 may be followed by computation block 905.

At a "Computation" block 905, each of the respective processors 811-815 may compare respective patterns with respective partitions, as distributed at block 904, in order to identify occurrences of patterns from dictionary 803 in the data stream 820. Block 905 is shown outside of DisPatch controller 802, as block 905 is performed by processors 811-815, and not necessarily by the DisPatch controller 802. In some embodiments, each respective processor may compare respective patterns with respective partitions at least in part by applying a distance measure to define similarity between the respective patterns and the respective partitions. The distance measure to be used by optionally be set by a user at DisPatch controller 802.

While various embodiments have been disclosed herein, other aspects and embodiments will be apparent to those skilled in art.

The invention claimed is:

1. A distributed pattern matching program stored in one or more non-transitory computer-readable mediums to identify occurrences of one or more patterns in a data stream, the program comprising instructions for performing the steps of:
dividing by a controller the data stream into a plurality of overlapping windows;
dividing by the controller each window into a plurality of overlapping partitions;
determining by the controller a number of processors to identify occurrences of the one or more patterns in the data stream within a bounded delay time;
distributing by the controller, to each respective processor among the determined number of processors, respective patterns from the one or more patterns to compare with respective partitions from the one or more partitions; and
instructing by the controller each respective processor to compare the respective patterns with the respective partitions, in order to identify occurrences of the one or more patterns in the data stream.

2. The distributed pattern matching program of claim 1, wherein an overlap of the plurality of overlapping windows is equal to or greater than a length of a longest pattern among the one or more patterns.

3. The distributed pattern matching program of claim 1, wherein an overlap of the plurality of overlapping partitions is a full length of a partition minus one sample.

4. The distributed pattern matching program of claim 1, wherein a length of one or more partitions is substantially equal to a length of at least one pattern.

5. The distributed pattern matching program of claim 1, wherein distributing, to each respective processor among the determined number of processors, respective patterns from the one or more patterns to compare with respective partitions from the one or more partitions comprises assigning first partitions associated with a first window to a first processor, and assigning second partitions associated with a second window to a second processor.

6. The distributed pattern matching program of claim 1, wherein distributing, to each respective processor among the determined number of processors, respective patterns from the one or more patterns to compare with respective partitions from the one or more partitions comprises assigning patterns of substantially a first length to a first processor, and assigning patterns of substantially a second length to a second processor.

7. The distributed pattern matching program of claim 1, wherein distributing, to each respective processor among the determined number of processors, respective patterns from the one or more patterns to compare with respective partitions from the one or more partitions comprises one or more map reduce operations.

8. The distributed pattern matching program of claim 1, wherein comparing, by each respective processor, the respective patterns with the respective partitions comprises applying a distance measure to define similarity between the respective patterns and the respective partitions.

9. The distributed pattern matching program of claim 1, wherein the bounded delay time comprises a user-specified bounded delay time.

10. The distributed pattern matching program of claim 1, wherein the data stream comprises earthquake monitoring data, industrial process monitoring data, or patient monitoring data.

11. A distributed pattern matching system to identify occurrences of one or more patterns in a data stream, comprising:
a plurality of processors; and
a distributed pattern matching control system including a tangible machine-readable storage device comprising instructions which, when executed in a computer-based language instructor comprising a controller, cause the controller to at least:
divide, via the controller, the data stream into a plurality of overlapping windows;
divide, via the controller, each window into a plurality of overlapping partitions;
determine, via the controller, a number of said plurality of processors to identify occurrences of the one or more patterns in the data stream within a bounded delay time; and
distribute, via the controller, to each respective processor among the determined number of processors, respective patterns from the one or more patterns to compare with respective partitions from the one or more partitions, wherein each respective processor compares the respective patterns with the respective partitions, in order to identify occurrences of the one or more patterns in the data stream.

12. The distributed pattern matching system of claim 11, wherein an overlap of the plurality of overlapping windows is equal to or greater than a length of a longest pattern among the one or more patterns.

13. The distributed pattern matching system of claim 11, wherein an overlap of the plurality of overlapping partitions is a full length of a partition minus one sample.

14. The distributed pattern matching system of claim 11, wherein a length of one or more partitions is substantially equal to a length of at least one pattern.

15. The distributed pattern matching system of claim 11, wherein distributing, to each respective processor among the determined number of processors, respective patterns from the one or more patterns to compare with respective partitions from the one or more partitions comprises assigning first partitions associated with a first window to a first processor, and assigning second partitions associated with a second window to a second processor.

16. The distributed pattern matching system of claim 11, wherein distributing, to each respective processor among the determined number of processors, respective patterns from the one or more patterns to compare with respective partitions from the one or more partitions comprises assigning patterns of substantially a first length to a first processor, and assigning patterns of substantially a second length to a second processor.

17. The distributed pattern matching system of claim 11, wherein distributing, to each respective processor among the determined number of processors, respective patterns from the one or more patterns to compare with respective partitions from the one or more partitions comprises one or more map reduce operations.

18. The distributed pattern matching system of claim 11, wherein comparing, by each respective processor, the respective patterns with the respective partitions comprises applying a distance measure to define similarity between the respective patterns and the respective partitions.

19. The distributed pattern matching system of claim 11, wherein the bounded delay time comprises a user-specified bounded delay time.

20. The distributed pattern matching system of claim 11, wherein the data stream comprises earthquake monitoring data, industrial process monitoring data, or patient monitoring data.

\* \* \* \* \*